(12) United States Patent
Murray et al.

(10) Patent No.: US 8,300,269 B2
(45) Date of Patent: Oct. 30, 2012

(54) DOT FORMING ELEMENT ARRAYS AT DIFFERENT RESOLUTIONS

(75) Inventors: Richard A. Murray, San Diego, CA (US); Christopher G. Wykoff, San Diego, CA (US); John A. Lebens, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 875 days.

(21) Appl. No.: 12/413,729

(22) Filed: Mar. 30, 2009

(65) Prior Publication Data

US 2010/0245855 A1   Sep. 30, 2010

(51) Int. Cl.
*H04N 1/60* (2006.01)
*H04N 1/46* (2006.01)
*B41J 2/145* (2006.01)

(52) U.S. Cl. .............................. 358/1.9; 358/534; 347/40

(58) Field of Classification Search .................... 358/1.9, 358/296, 534; 347/41, 40, 16, 43, 130, 131, 347/12
See application file for complete search history.

(56) References Cited

U.S. PATENT DOCUMENTS

| | | | |
|---|---|---|---|
| 5,030,971 A | | 7/1991 | Drake et al. |
| 5,764,254 A | * | 6/1998 | Nicoloff et al. ................. 347/43 |
| 5,949,453 A | | 9/1999 | Harris et al. |
| 5,975,679 A | | 11/1999 | Nicoloff, Jr. et al. |
| 6,485,125 B2 | * | 11/2002 | Fujioka et al. ................. 347/41 |
| 2007/0285451 A1 | | 12/2007 | Noguchi |
| 2007/0285463 A1 | | 12/2007 | Kanda et al. |
| 2009/0009547 A1 | * | 1/2009 | Udagawa et al. ............... 347/12 |

FOREIGN PATENT DOCUMENTS

| | | |
|---|---|---|
| JP | 61 104856 A | 5/1986 |
| WO | WO 91/08902 A1 | 6/1991 |

* cited by examiner

*Primary Examiner* — Charlotte M Baker
(74) *Attorney, Agent, or Firm* — Peyton C. Watkins

(57) ABSTRACT

A printing device includes a first array of dot forming elements disposed on a substrate along an array direction at a first array-direction spacing to provide a first dot forming resolution $R_1$ for dots of a first color; and a group of N arrays of dot forming elements, wherein the dot forming elements in each array of the group of N arrays are disposed on the substrate along the array direction at a second array-direction spacing to provide a dot forming resolution equal to $R_1/N$; at least one of the N arrays of dot forming elements forms dots of a different color than at least one of the other arrays of the N arrays in the group; and N is greater than 1.

20 Claims, 12 Drawing Sheets

DOT FORMING ELEMENT ARRAYS AT DIFFERENT RESOLUTIONS

FIELD OF THE INVENTION

This invention relates generally to the field of printing devices, and more particularly to a printing device for printing a plurality of different colored dots.

BACKGROUND OF THE INVENTION

Many types of printing systems include one or more printheads that have arrays of dot forming elements that are controlled to make marks of particular sizes, colors, or densities in particular locations on the print media in order to print the desired image. In some types of printing systems the array(s) of dot forming elements extends across the width of the page, and the image can be printed one line at a time. However, the cost of a printhead that includes a page-width array of marking elements is too high for some types of printing applications, so a carriage printing architecture is used.

In a carriage printing system (whether for desktop printers, large area plotters, etc.) the printhead or printheads are mounted on a carriage that is moved past the recording medium in a carriage scan direction as the dot forming elements are actuated to make a swath of dots. At the end of the swath, the carriage is stopped, printing is temporarily halted and the recording medium is advanced. Then another swath is printed, so that the image is formed swath by swath. In a carriage printer, the dot forming element arrays are typically disposed along an array direction that is substantially parallel to the media advance direction, and substantially perpendicular to the carriage scan direction. The length of the dot forming element array determines the maximum swath height that can be used to print an image.

Many carriage printing systems include multipass print modes in which the dots in a given region of the recording medium are formed in a plurality of printing passes. In multipass printing, responsibility for printing each raster line of the image is shared between a plurality of dot forming elements. In this way the nonuniform marking behavior of dot forming elements can be disguised in order to provide improved image quality. For an inkjet printer, multipass printing can provide time for improving the uniformity of ink-media interactions by controlling the pattern of dots that can be printed within one pass, thereby reducing coalescence (i.e. flowing together of ink drops on the surface of the page before they soak into the page). Multipass printing can also enable multitone printing in which multiple dots are printed in the same pixel locations.

For a color printer it can be advantageous to have arrays of dot forming elements for plurality of different colors resident on a single printing device within a single printhead. Printing devices that are fabricated using typical manufacturing technologies, including those used in the semiconductor industry, have dot forming elements on a single device that are very uniform in characteristics and well aligned to one another. This is advantageous because print quality is improved if the resulting dots are well-aligned to one another, and the printer can operate more reliably if operating conditions (including voltage and pulsewidth for forming dots) can be selected such that they are optimal or nearly optimal for all of the dot forming elements.

Conventional multicolor printing devices include a plurality of dot forming arrays for forming a respective plurality of different colored dots, but the spacing of dot forming elements within each array on such conventional devices is substantially the same for each array. As a result, the amount of space required on a printing device for M different arrays of dot forming elements (plus the electronics, leads, and colorant supply pathways for each array) is substantially equal to M times the space required for a single array. The size of the printing device is a significant contributor to the cost of a printhead. Because many printing devices are typically made simultaneously using wafer processing, the larger the printing device is, the fewer that can be fit on a wafer, and therefore the higher the cost of the printing device. In addition, a defect is more likely to occur on a larger device than on a smaller device, leading to a lower yield and therefore a higher cost for larger printing devices. Of course, it is possible to reduce the size of a conventional printing device by shortening the length of the arrays of dot forming elements. However, this would result in more printing passes being required in order to print an image, and therefore a longer time required to print an image. What is needed is a multicolor printing device having a smaller size than a conventional multicolor printing device, but without a substantial penalty in printing throughput.

SUMMARY OF THE INVENTION

According to one aspect of the present invention, the invention resides in a printing device having a first array of dot forming elements disposed on a substrate along an array direction at a first array-direction spacing to provide a first dot forming resolution $R_1$ for dots of a first color; and a group of N arrays of dot forming elements, wherein the dot forming elements in each array of the group of N arrays are disposed on the substrate along the array direction at a second array-direction spacing to provide a dot forming resolution equal to $R_1/N$; at least one of the N arrays of dot forming elements forms dots of a different color than at least one of the other arrays of the N arrays in the group; and N is greater than 1.

DETAILED DESCRIPTION OF THE INVENTION

Figure 1:
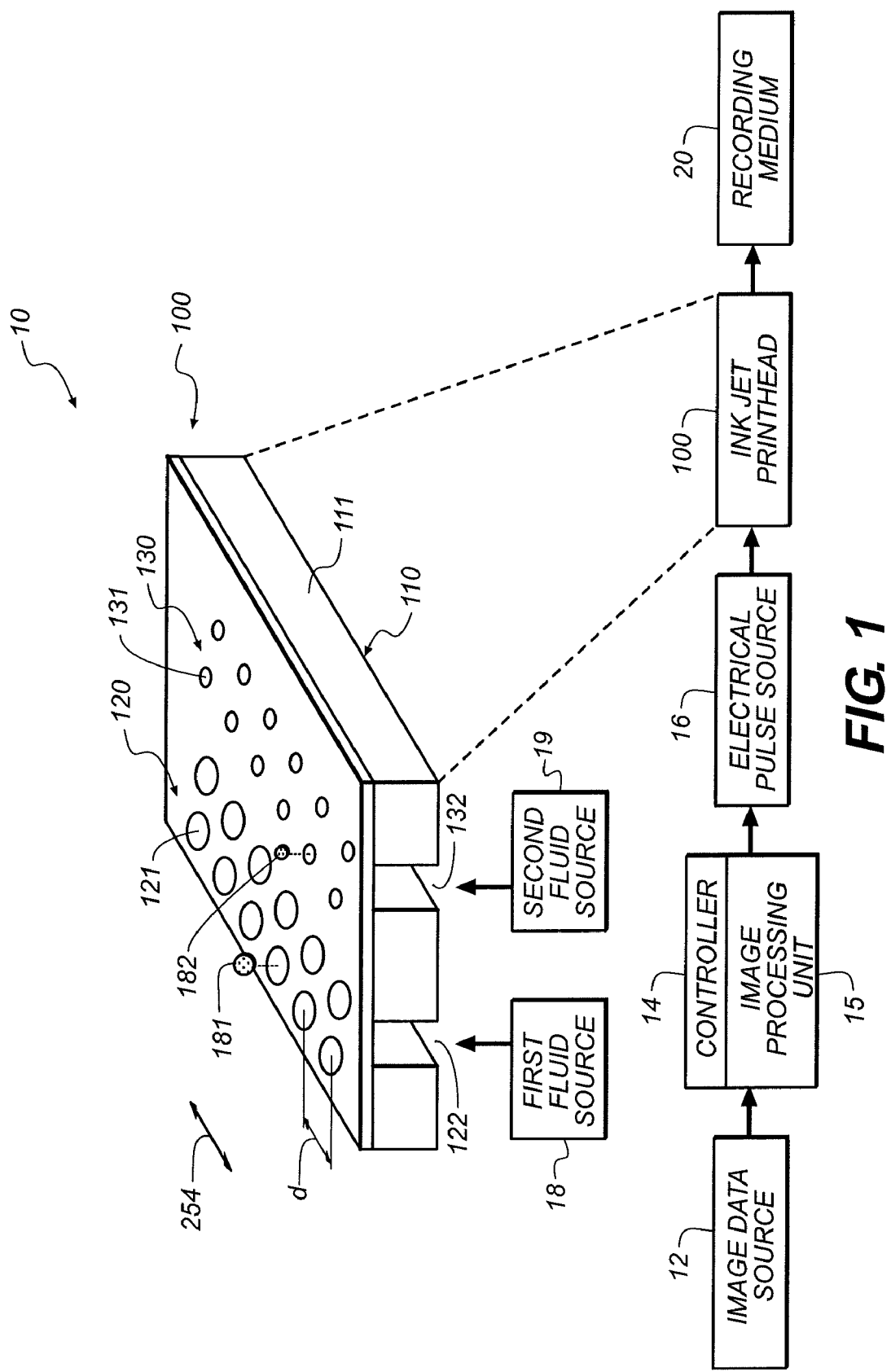
FIG. 1 is a schematic representation of an inkjet printer system.

Referring to FIG. 1, a schematic representation of an inkjet printer system 10 is shown, for its usefulness with the present invention and is fully described in U.S. Pat. No. 7,350,902, and is incorporated by reference herein in its entirety. Inkjet printer system 10 includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110.

In the example shown in FIG. 1, there are two nozzle arrays 120 and 130 that are each disposed along a nozzle array direction 254. Nozzles 121 in the first nozzle array 120 have a larger opening area than nozzles 131 in the second nozzle array 130. In this example, each of the two nozzle arrays has two staggered rows of nozzles, each row having a nozzle density of 600 per inch. The effective nozzle density then in each array is 1200 per inch (i.e. d=1/1200 inch in FIG. 1). If pixels on the recording medium 20 were sequentially numbered along the paper advance direction, the nozzles from one row of an array would print the odd numbered pixels, while the nozzles from the other row of the array would print the even numbered pixels.

In fluid communication with each nozzle array is a corresponding ink delivery pathway. Ink delivery pathway 122 is in fluid communication with the first nozzle array 120, and ink delivery pathway 132 is in fluid communication with the second nozzle array 130. Portions of ink delivery pathways 122 and 132 are shown in FIG. 1 as openings through printhead die substrate 111. One or more inkjet printhead die 110 will be included in inkjet printhead 100, but for greater clarity only one inkjet printhead die 110 is shown in FIG. 1. The printhead die are arranged on a mounting support member as discussed below relative to FIG. 3. In FIG. 1, first fluid source 18 supplies ink to first nozzle array 120 via ink delivery pathway 122, and second fluid source 19 supplies ink to second nozzle array 130 via ink delivery pathway 132. Although distinct fluid sources 18 and 19 are shown, in some applications it may be beneficial to have a single fluid source supplying ink to both the first nozzle array 120 and the second nozzle array 130 via ink delivery pathways 122 and 132, respectively. Also, in some embodiments, fewer than two or more than two nozzle arrays can be included on inkjet printhead die 110. In some embodiments, all nozzles on inkjet printhead die 110 can be the same size, rather than having multiple sized nozzles on inkjet printhead die 110.

Not shown in FIG. 1, are the drop forming mechanisms associated with the nozzles. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on a recording medium 20.

Figure 2:
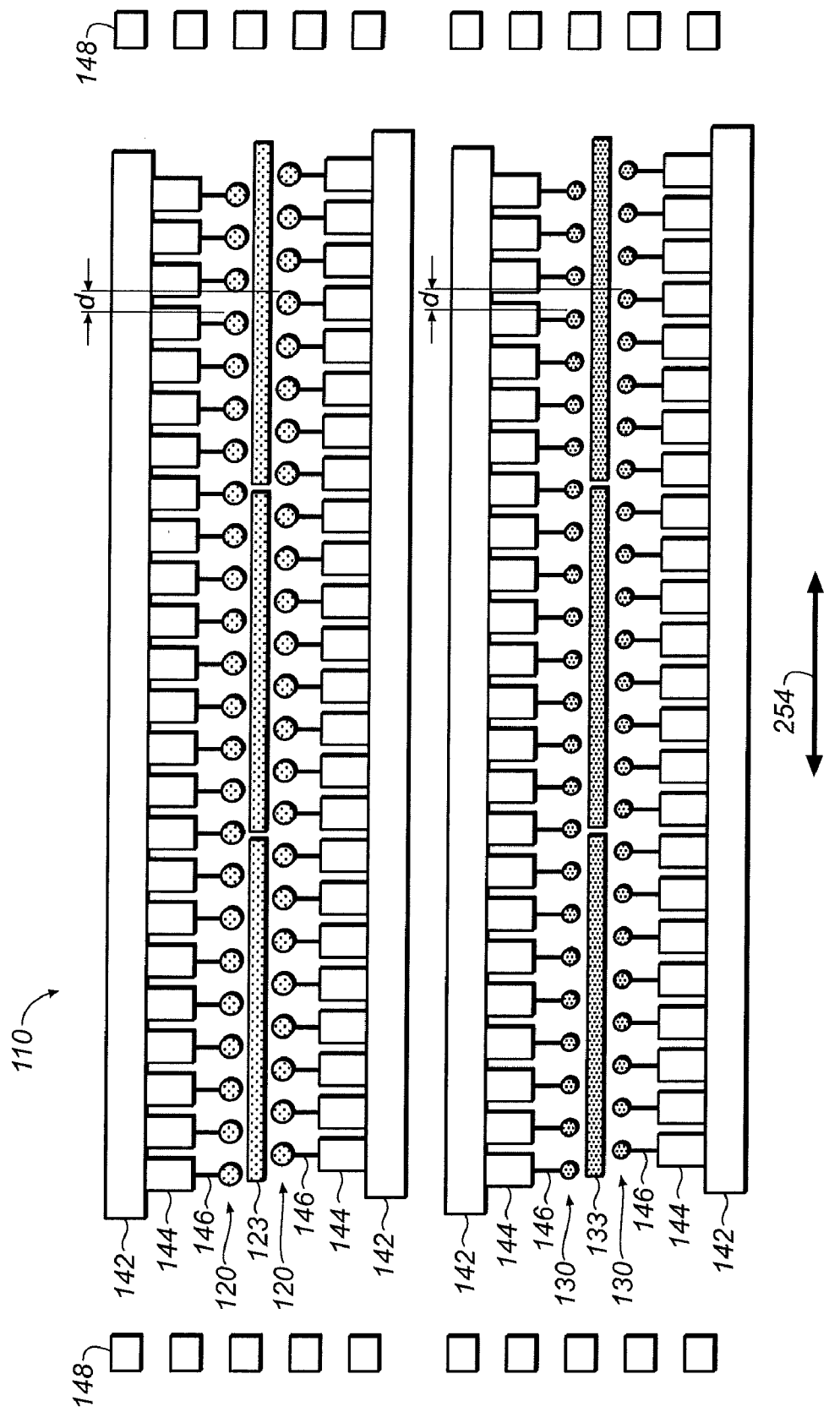
FIG. 2 is a schematic layout of a printhead die including two nozzle arrays plus associated electronics.

Referring to FIG. 2, an inkjet printhead die 110 having array lengths of a half inch with nozzles at 1200 per inch will have about 600 nozzles per array. For inkjet printhead die 110 that have more than one hundred nozzles, logic electronics 142 and driver transistors 144 are typically integrated onto the inkjet printhead die 110 so that the number of interconnection pads 148 can be reduced, as illustrated in the schematic printhead die layout of FIG. 2. Rather than requiring an interconnection pad 148 for each nozzle in nozzle arrays 120 and 130, in order to power the associated drop forming mechanisms, instead a few inputs, such as serial data, clock, ejector power, logic power, ground, and other control signals are connected to interconnection pads 148. Electrical input signals, plus power and ground are connected to the logic electronics and driver transistors by wiring (not shown) that is patterned on the inkjet printhead die 110. Electrical leads 146 bring power pulses from the driver transistors 144 associated with the drop forming mechanisms for the nozzles in nozzle arrays 120 and 130. In the example shown in FIG. 2, there is one driver transistor 144 for each nozzle in nozzle arrays 120 and 130. However, because there are driver transistors 144 on both sides of each staggered array, the spacing of driver transistors 144 is similar to a single row of the staggered array. Thus, if each row of the staggered nozzle array 120 or 130 is at 600 per inch (for an effective printing resolution of 1200 per inch in the array direction), the driver transistors 144 are at a spacing corresponding to a packing density of 600 per inch. Also shown in FIG. 2 are ink feed slots 123 and 133 that are part of ink delivery pathways 122 and 132 (with reference to FIG. 1) for nozzle arrays 120 and 130, respectively. For staggered arrays, a typical ink feed design is a slot that extends parallel to nozzle array direction 254 between the two rows of nozzles in a staggered array. For mechanical strength, rather than a continuous ink feed slot that extends the length of the nozzle array, there can be a series of ink feed slots with strengthening ribs between adjacent slots, as illustrated in FIG. 2.

Figure 3:
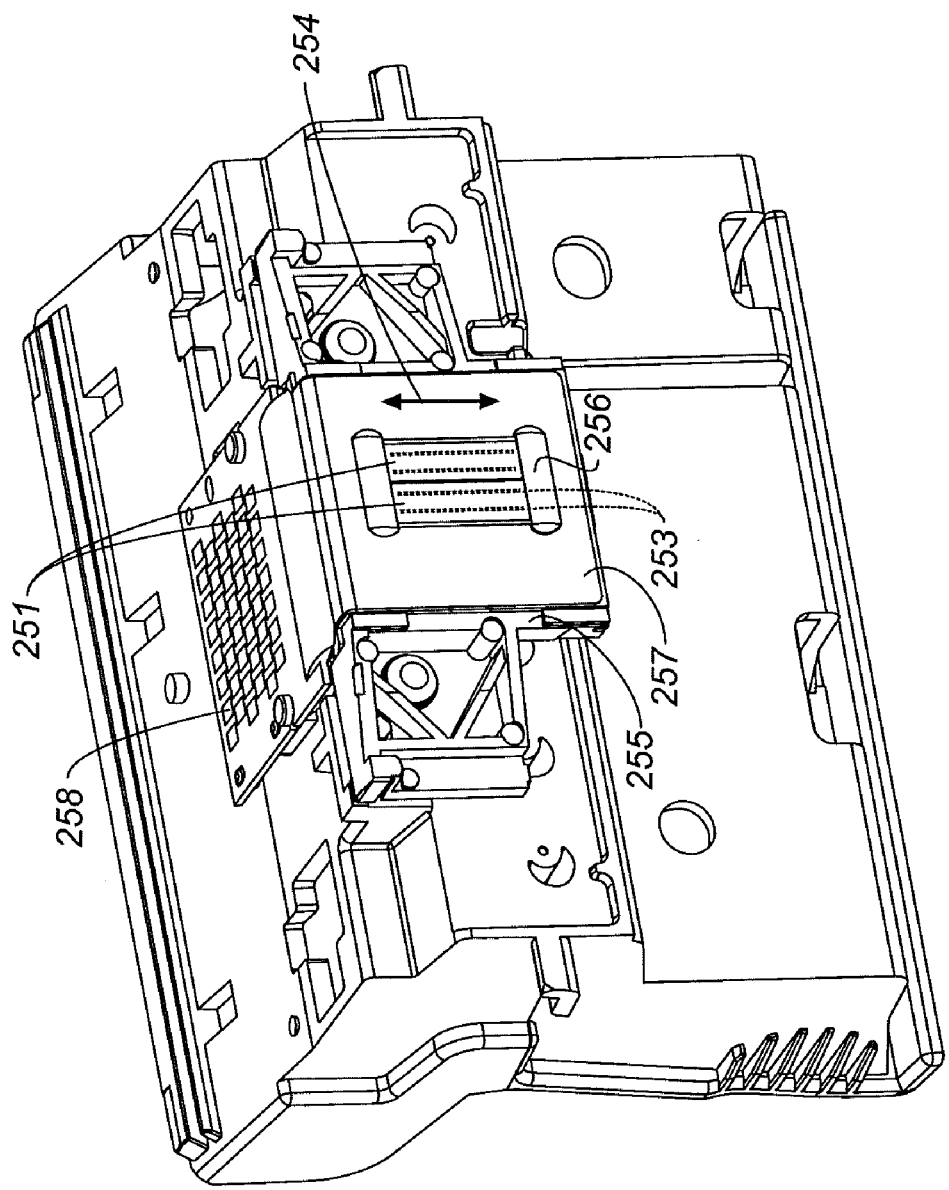
FIG. 3 is a perspective view of a portion of a printhead chassis.

FIG. 3 shows a perspective view of a portion of a printhead chassis 250, which is an example of an inkjet printhead 100. Printhead chassis 250 includes two printhead die 251 (similar to inkjet printhead die 110 of FIGS. 1 and 2) that are affixed to a common mounting support member 255. Each printhead die 251 contains two nozzle arrays 253, so that printhead chassis 250 contains four nozzle arrays 253 altogether. The four nozzle arrays 253 in this example can each be connected to separate ink sources (not shown in FIG. 3), such as cyan, magenta, yellow, and black. Each of the four nozzle arrays 253 is disposed along nozzle array direction 254, and the length of each nozzle array along nozzle array direction 254 is typically on the order of 1 inch or less. Typical lengths of recording media are 6 inches for photographic prints (4 inches by 6 inches) or 11 inches for paper (8.5 by 11 inches). Thus, in order to print a full image, a number of swaths are successively printed while moving printhead chassis 250 across the recording medium 20. Following the printing of a swath, the recording medium 20 is advanced along a media advance direction that is substantially parallel to nozzle array direction 254.

Also shown in FIG. 3 is a flex circuit 257 to which the printhead die 251 are electrically interconnected, for example, by wire bonding or TAB bonding. The interconnections and interconnection pads 148 (with reference to FIG. 2) are covered by an encapsulant 256 to protect them. Flex circuit 257 bends around the side of printhead chassis 250 and connects to connector board 258. When printhead chassis 250 is mounted into the carriage 200 (see FIG. 4), connector board 258 is electrically connected to a connector (not shown) on the carriage 200, so that electrical signals can be transmitted to the printhead die 251.

Figure 4:
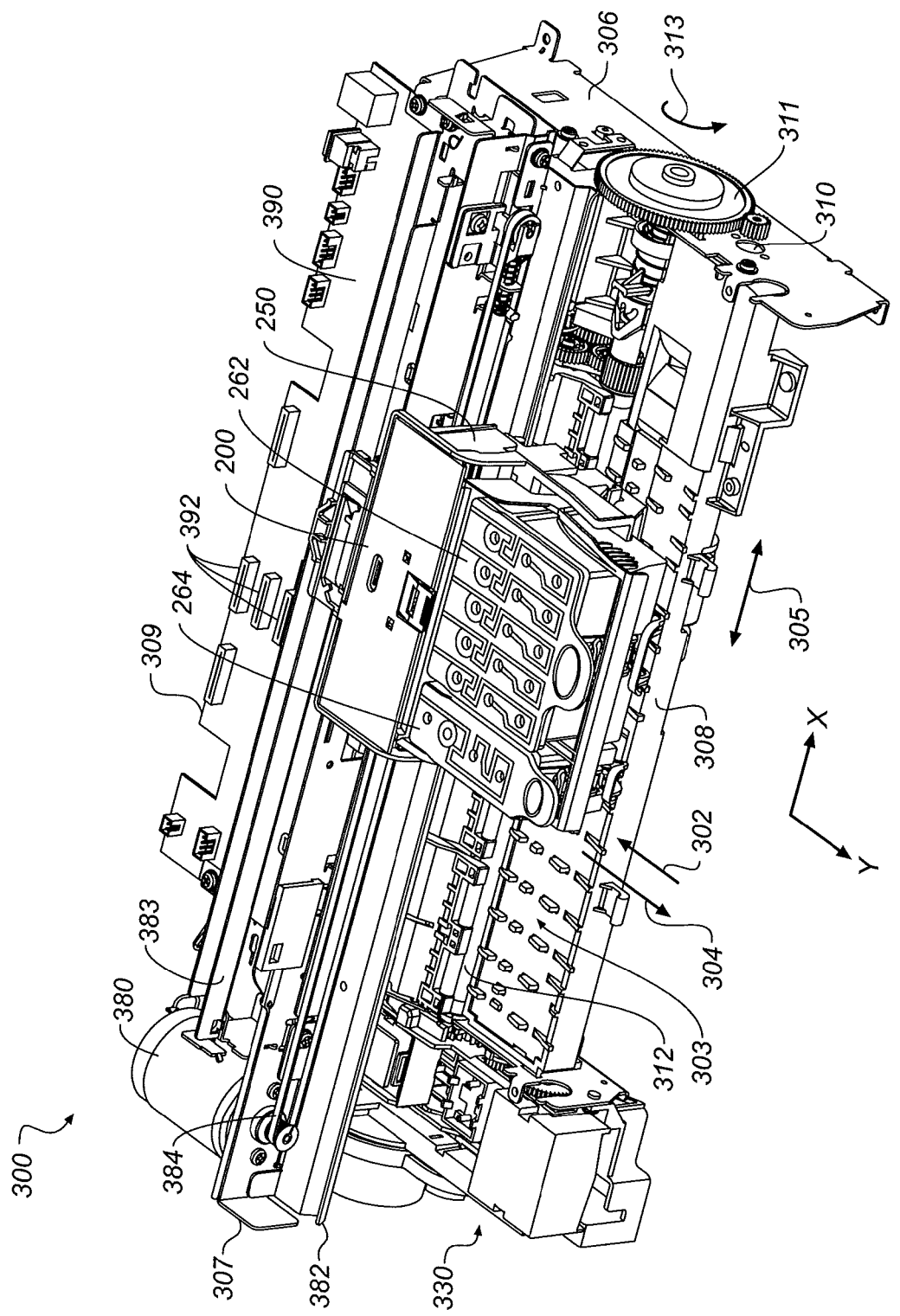
FIG. 4 is a perspective view of a portion of a carriage printer.

FIG. 4 shows a portion of a desktop carriage printer. Some of the parts of the printer have been hidden in the view shown in FIG. 4 so that other parts can be more clearly seen. Printer chassis 300 has a print region 303 across which carriage 200 is moved back and forth in carriage scan direction 305 along the X axis, between the right side 306 and the left side 307 of printer chassis 300, while drops are ejected from printhead die 251 (not shown in FIG. 4) on printhead chassis 250 that is mounted on carriage 200. Carriage motor 380 moves belt 384 to move carriage 200 along carriage guide rail 382. An encoder sensor (not shown) is mounted on carriage 200 and indicates carriage location relative to an encoder fence 383.

Printhead chassis 250 is mounted in carriage 200, and multi-chamber ink supply 262 and single-chamber ink supply 264 are mounted in the printhead chassis 250. The mounting orientation of printhead chassis 250 is rotated relative to the view in FIG. 3, so that the printhead die 251 are located at the bottom side of printhead chassis 250, the droplets of ink being ejected downward onto the recording medium in print region 303 in the view of FIG. 4. Multi-chamber ink supply 262, for example, contains three ink sources: cyan, magenta, and yellow ink; while single-chamber ink supply 264 contains the ink source for black. Paper or other recording medium (sometimes generically referred to as paper or media herein) is loaded along paper load entry direction 302 toward the front of printer chassis 308.

Figure 5:
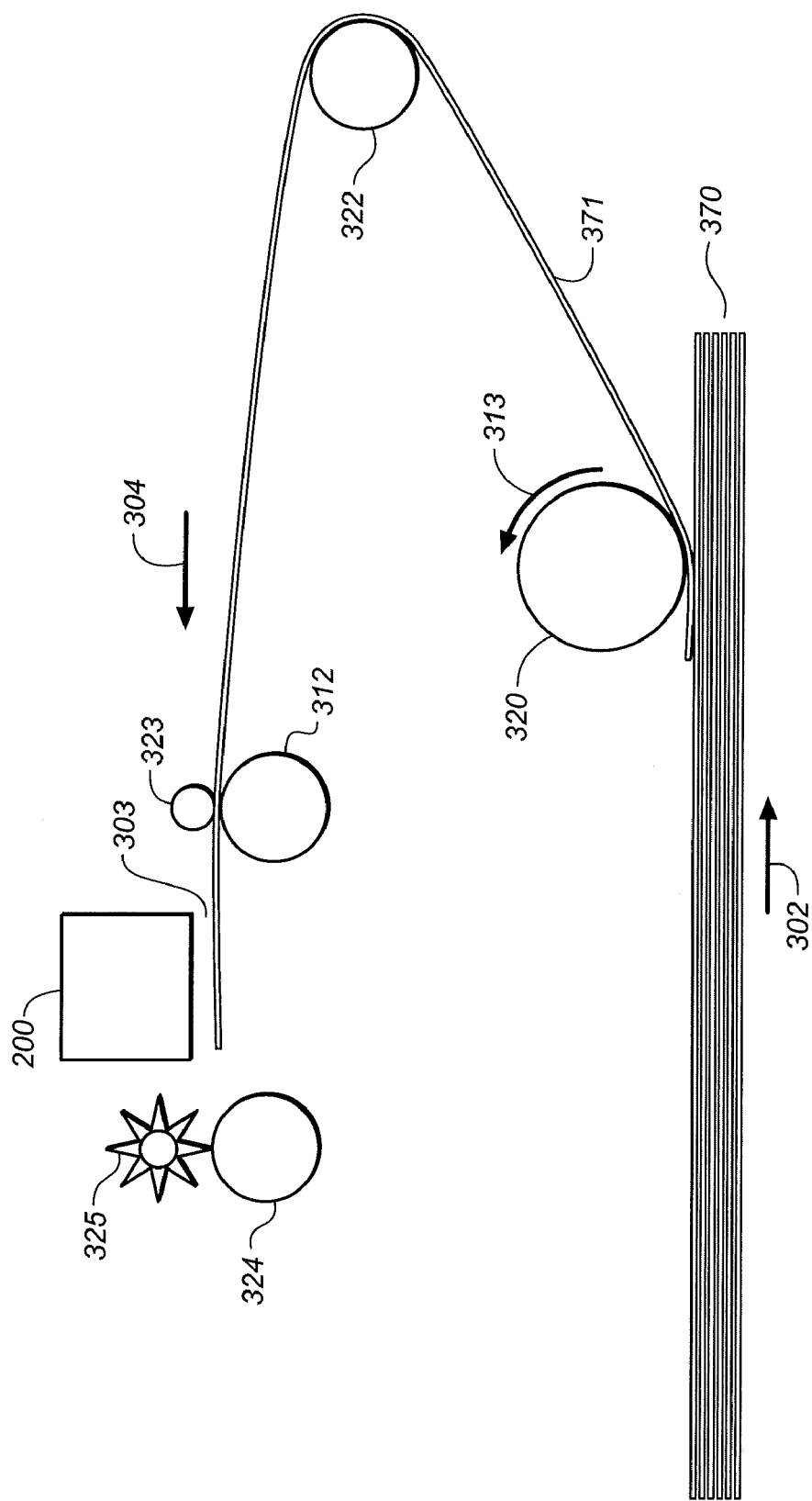
FIG. 5 is a schematic side view of an exemplary paper path in a carriage printer.

A variety of rollers are used to advance the medium through the printer as shown schematically in the side view of FIG. 5. In this example, a pick-up roller 320 moves the top piece or sheet 371 of a stack 370 of paper or other recording medium in the direction of arrow, paper load entry direction 302. A turn roller 322 acts to move the paper around a C-shaped path (in cooperation with a curved rear wall surface) so that the paper continues to advance along media advance direction 304 from the rear 309 of the printer chassis (with reference also to FIG. 4). The paper is then moved by feed roller 312 and idler roller(s) 323 to advance along the Y axis across print region 303, and from there to a discharge roller 324 and star wheel(s) 325 so that printed paper exits along media advance direction 304. Feed roller 312 includes a feed roller shaft along its axis, and feed roller gear 311 (see FIG. 4) is mounted on the feed roller shaft. Feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller.

The motor that powers the paper advance rollers is not shown in FIG. 4, but the hole 310 at the right side of the printer chassis 306 is where the motor gear (not shown) protrudes through in order to engage feed roller gear 311, as well as the gear for the discharge roller (not shown). For normal paper pick-up and feeding, it is desired that all rollers rotate in forward rotation direction 313. Toward the left side of the printer chassis 307, in the example of FIG. 4, is the maintenance station 330.

Toward the rear of the printer chassis 309, in this example, is located the electronics board 390, which includes cable connectors 392 for communicating via cables (not shown) to the printhead carriage 200 and from there to the printhead chassis 250. Also on the electronics board are typically mounted motor controllers for the carriage motor 380 and for the paper advance motor, a processor and/or other control electronics (shown schematically as controller 14 and image processing unit 15 in FIG. 1) for controlling the printing process, and an optional connector for a cable to a host computer.

Figure 6:
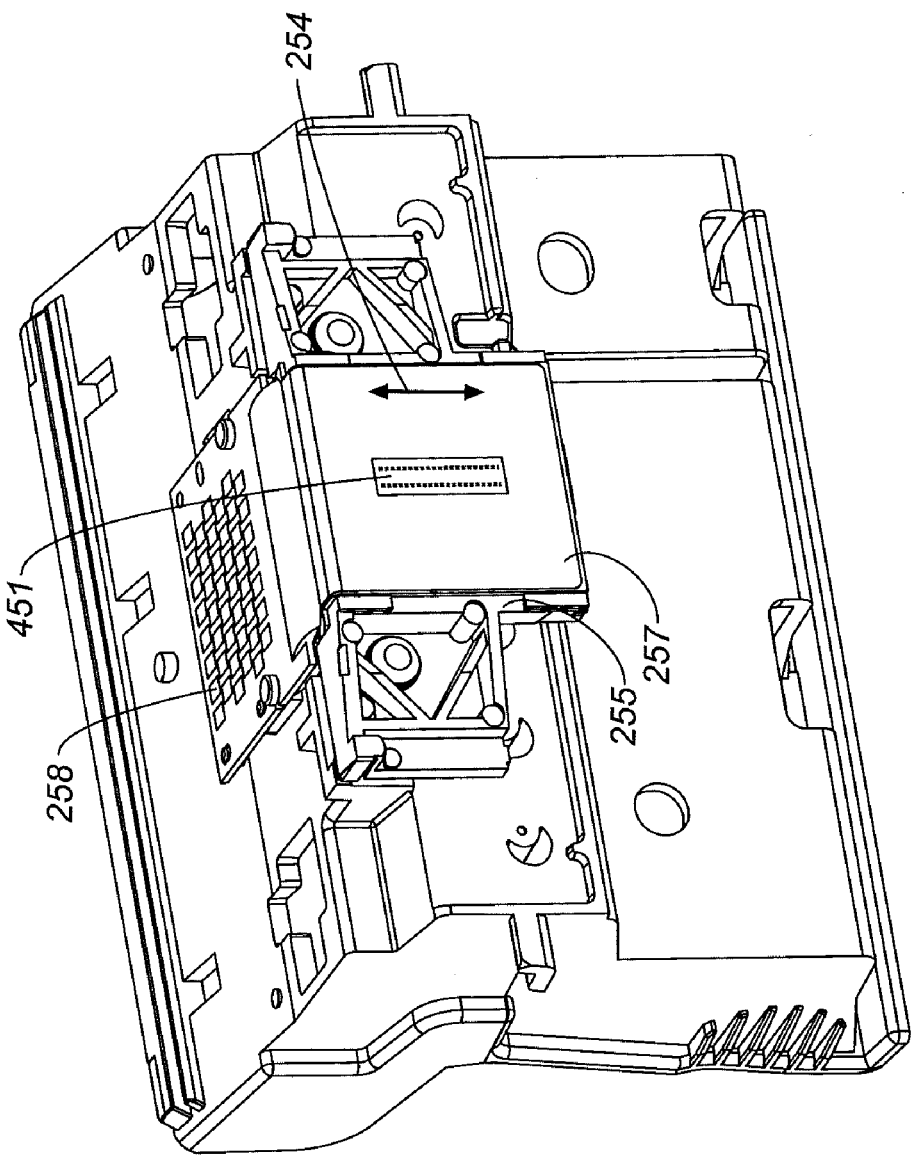
FIG. 6 is a perspective view of a portion of a printhead chassis.

Inventive aspects of the present invention relate to incorporating a plurality of arrays of dot forming elements on a single printing device in such a way that a more compact multicolor printing device is provided, but without a substantial loss in printing productivity. With reference to FIGS. 3 and 6, rather than two printhead die 251 being required, for example, a single printhead die 451 is provided that is substantially the same size as a printhead die 251, but includes nozzle arrays for black, cyan, magenta and yellow. In such an example, not only is the printhead die cost cut approximately in half, but also other portions of the printhead chassis 250, such as the mounting support member 255 and flex circuit 257 can also be reduced in size, resulting in further cost savings.

Figure 7:
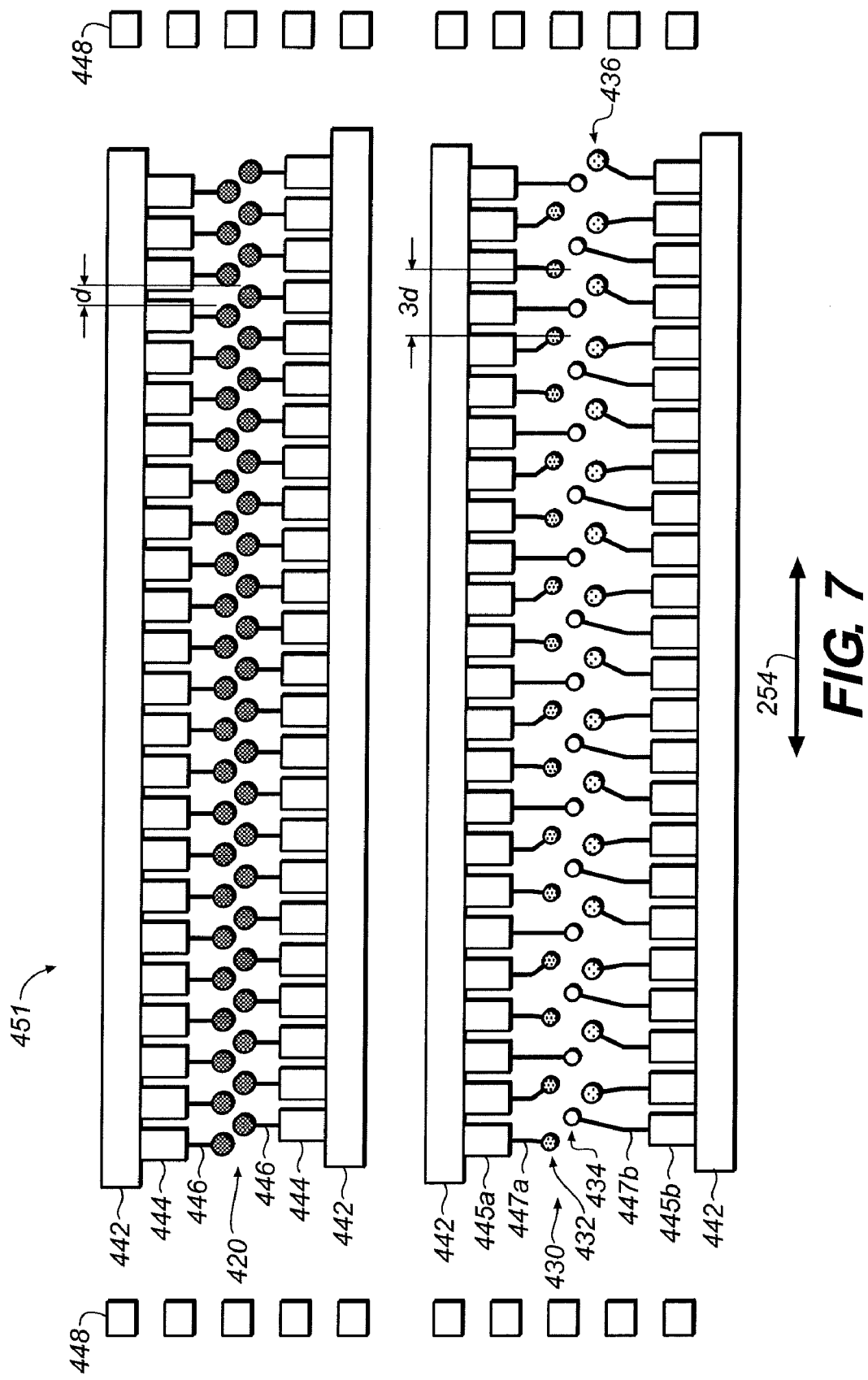
FIG. 7 is a schematic layout of a printhead die including a first array of nozzles and a group of three arrays of nozzles, according to an embodiment of the invention.

FIG. 7 shows an embodiment of the present invention, including a first array 420 and a group 430 of N=3 arrays of nozzles disposed along nozzle array direction 254. The configuration of first array 420, as well as the associated logic electronics 442, driver transistors 444, and electrical leads 446 looks very similar to the configuration of the first nozzle array 120 of FIG. 2. The first array 420 of nozzles is at a spacing d along the nozzle array direction 254, so that the effective printing resolution of first array 420 is $R_1 = 1/d$. Thus, if d is 1/1200 inch (~21.17 microns), the effective printing resolution $R_1$ of first array 420 is 1200 dots per inch. Rather than having a second array similar to second nozzle array 130 of FIG. 2, there is a group 430 of N arrays of nozzles (where in this example, N=3). The three arrays in group 430 include first outermost array 432, inner array 434, and second outermost array 436, each of which has a nozzle spacing of Nd=3d, or equivalently a printing resolution equal to $R_1/N = R_1/3$. First outermost array 432, inner array 434 and second outermost array 436 are displaced from each other in a direction that is perpendicular to nozzle array direction 254. In this example, the total number of nozzles in the group 430 of 3 arrays is the same as the total number of nozzles in first array 420. Since there is one driver transistor for each nozzle, the total number of driver transistors 445a plus driver transistors 445b for the group 430 of three arrays is the same as the total number of driver transistors 444 for the first array 420. Driver transistors 445a provide power pulses not only to the nozzles in the first outermost array 432 that is closest to it, but also to half of the nozzles in inner array 434. Similarly, driver transistors 445b provide power pulses not only to the nozzles in the second outermost array 436 that is closest to it, but also to the other half of the nozzles in inner array 434. The drop forming mechanisms corresponding to nozzles in the inner array 434 are powered in spatially alternating fashion by driver transistors 445a or 445b. Thus, in this example, the packing density of driver transistors 445a and 445b for the group 430 is the same as the packing density of driver transistors 444 for first array 420. The pattern of electrical leads 447a from driver transistors 445a is that two successive leads 447a go to adjacent nozzles in first outermost array 432, and then a lead 447a goes to a nozzle in inner array 434. Similarly, the pattern of electrical leads 447b from driver transistors 445b is that two successive leads 447b go to adjacent nozzles in second outermost array 436, and then a lead 447b goes to a nozzle in inner array 434.

For clarity, ink feeds are not shown in FIG. 7, but the ink feed geometry for the first array 420 can be similar to the ink feed slots 123 for first nozzle array 120 in FIG. 2. It can be appreciated that for the group 430 of three arrays, long ink feed slots positioned between arrays of group 430 would be problematic because of the electrical leads 447a and 447b, especially those leads that extend to the inner array 434.

Figure 8:
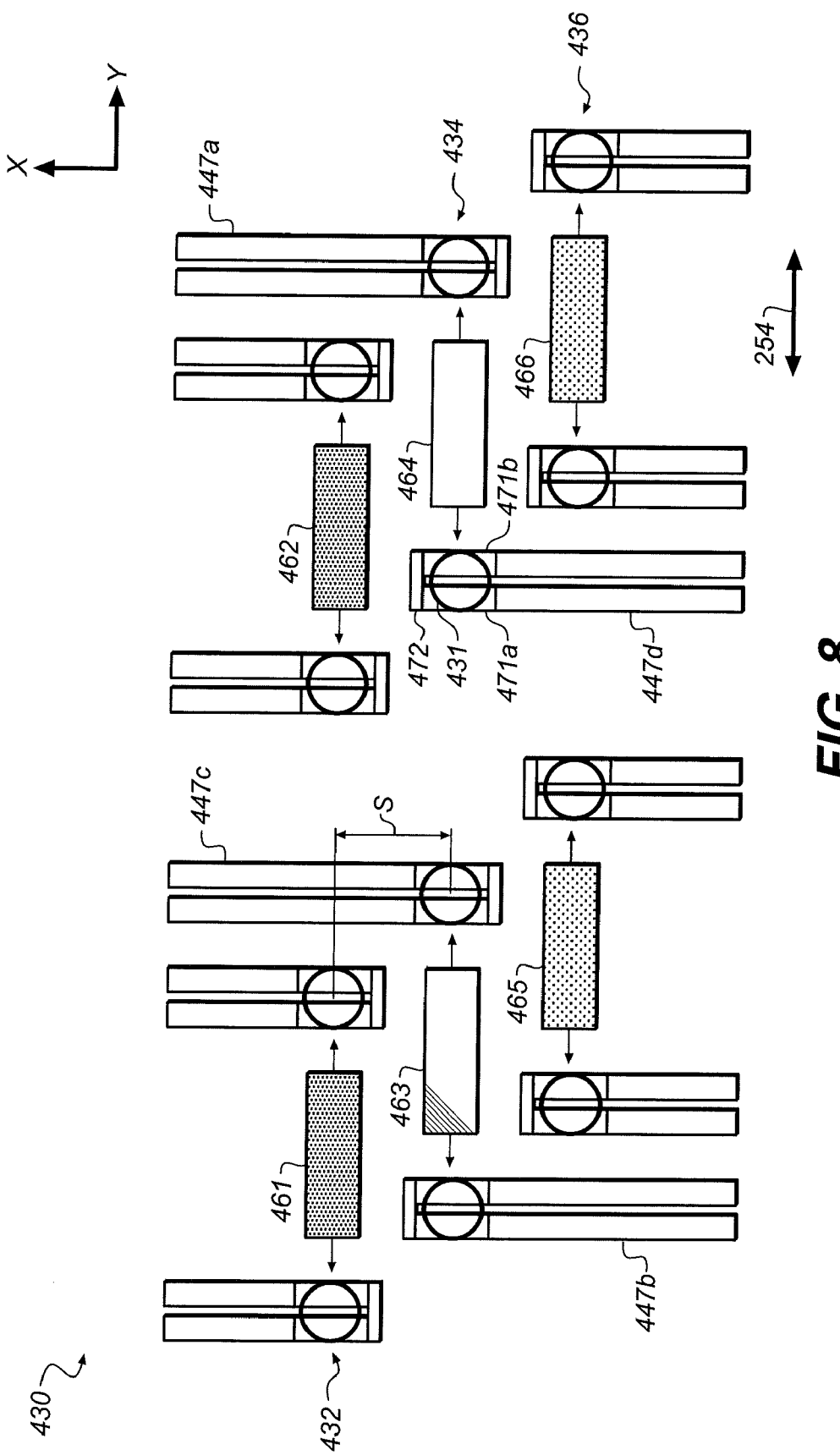
FIG. 8 is a close-up view of a portion of a group of arrays of nozzles and their respective ink feeds and electrical leads, according to an embodiment of the invention.

A portion of group 430 of three arrays is shown at higher magnification (together with the ink feeds) in FIG. 8. In this example, the drop forming mechanisms are thermal inkjet heaters. A thermal inkjet heater plus its associated nozzle is also called an inkjet drop ejector, and is a type of dot forming element. Associated with each nozzle 431 in group 430 is a heater having two heater legs 471a and 471b that are joined by a shorting bar 472 (but other heater geometries are also possible). Electrical leads 447 for each heater include a lead from the driver transistors (not shown) and a current return lead. In the example shown in FIG. 8, pairs of nozzles in first outermost array 432 are supplied with ink by ink feed holes such as 461 and 462 between the pairs. Arrows show the direction of ink flow from the ink feed holes to the nozzles. Similarly, pairs of nozzles in second outermost array 436 are supplied with ink by ink feed holes such as 465 and 466 between the pairs. Also, pairs of nozzles in inner array 434 are supplied with ink by ink feed holes such as 463 and 464 between the pairs. The ink feed holes 461 to 466 can have a length of about 40 microns and still fit between pairs of nozzles that are spaced center to center by Nd=3d=63.5 microns (400 nozzles per inch), corresponding to a spacing d=21.17 microns (1200 nozzles per inch) in first array 420 (with reference to FIG. 7). Further details on such small ink feed holes and methods of fabricating them are included in U.S. Patent Application Publication No. 2008/0180485 and in U.S. Pat. No. 8,173,030, which are incorporated herein by reference. Note that leads (such as 447c and 447d) from the heaters in inner array 434 pass between adjacent ink feed holes 461 and 462 for the first outermost array 432, or between adjacent ink feed holes 465 and 466 for the second outermost array 436, respectively. If a larger portion of group 430 were shown, it would be seen that the leads extending from the end heaters of inner array 434 (with reference to the heaters shown in FIG. 8), also pass between adjacent ink feed holes (not shown in FIG. 8) of first outermost array 432 or second outermost array 435. Electrical leads for half of the dot forming elements in inner array 434 pass between ink feed holes (sometimes generically called colorant supply holes herein) of the first outermost array 432, and the other half pass between ink feed holes of the second outermost array 436.

In a particular example of the embodiment shown in FIGS. 7 and 8, first array 420 is fed black ink, so that first array 420 forms black dots, for example at 1200 dpi along the nozzle array direction 254. The N=3 arrays in group 430 can be fed cyan, yellow and magenta inks in order to form cyan dots, yellow dots and magenta dots respectively, so that printhead die 451 is capable of printing all four printing color inks CMYK. For example, first outermost array 432 can be fed cyan ink through ink feed holes such as 461 and 462; inner array 434 can be fed yellow ink through ink feed holes such as 463 and 464; and second outermost array 436 can be fed magenta ink through ink feed holes such as 465 and 466. An advantage of having arrays of drop ejectors for all four printing colors CMYK on the same printhead die 451 (i.e. the same printing device) is that the alignment of the nozzles of the different arrays with respect to each other is built in by photolithography during wafer fabrication. Alignment of the arrays with respect to each other does not require mechanical alignment (as it would if the arrays were on different printing devices) and the alignment is better than could routinely be achieved with mechanical alignment. In addition, because the arrays of drop ejectors for CMYK are fabricated on the same printing device, the drop forming mechanisms will have better uniformity than if they were formed on different printhead die from the same wafer or from different wafers. For the example of a thermal inkjet printing device, the heaters for the CMYK arrays will have more nearly equal resistivities, so that a single operating voltage will not be too high for some arrays or too low for other arrays, but will provide more uniformly optimal operating conditions for all drop ejectors on printhead die 451.

Optionally, the dot forming elements (the heaters and their associated nozzles) for first array 420 and group 430 of arrays can be sized to provide different sized spots. For example, the drop ejectors in first array 420 (having a printing resolution of 1200 per inch along the array direction) can eject a drop volume of black ink approximately equal to six picoliters. On many types of recording media, such a drop size produces black dots having a diameter of about 40 microns that overlap on a 1200 dpi grid so that that printing of black and white documents (such as text) can be done in a fast single-pass print mode. In some embodiments, the drop ejectors in group 430 for cyan, magenta, and/or yellow can be designed to produce color drops having sizes that are not equal to the black drop size. For example, in order to print color photographic images having excellent image quality with low graininess, it can be advantageous to print with cyan, magenta and yellow drops that are smaller than six picoliters. On many types of recording medium a three picoliter drop produces a dot size of about 25 microns which is better for reducing graininess. A printhead die 451 having such a first array 420 of nozzles for ejecting six-picoliter black drops at 1200 dpi and a group 430 of arrays for ejecting three-picoliter cyan, magenta and yellow drops at 400 dpi is thus capable of printing text documents at high speed and is also capable of printing color photographs at high image quality. Relative to multipass printing that is used to print color photographs, for example in 6 passes using a printhead such as that shown in FIG. 3 using two printhead die 251 having arrays of 1200 per inch nozzles for each of cyan, magenta, yellow and black, the single printhead die 451 such as that shown in FIGS. 6 through 8 can print a color image having similar quality in 6 pass printing at a similar printing throughput. The 6 pass printing for printhead die 451 includes 3 passes to interlace such that the 400 nozzles per inch can provide 1200 dots per inch along the nozzle array direction 254. For each "interlace pass" there are two "banding passes" such that responsibility for printing dots on any one 1200 dpi raster line is shared between two different drop ejectors in order to hide image quality defects that could arise from defective drop ejectors. In addition, the two banding passes can deposit up to two drops of ink on the same pixel location, in order to extend the color gamut provided by the small color drops to deeper density colors.

In the embodiment shown in FIG. 8, adjacent members of a pair of drop ejectors that are supplied with ink by the same ink feed hole are fed from opposite directions. For example, ink feed hole 461 feeds one drop ejector in first outermost array 432 by a left to right ink flow (along the Y direction that is parallel to nozzle array direction 254), and it feeds an adjacent drop ejector by a right to left ink flow. In some cases, an asymmetric ink flow can cause drop ejectors to eject ink asymmetrically. As a result, ink dots from adjacent drop ejectors can be alternately too close together or too far apart relative to their ideal locations, resulting in an objectionable image defect. A problem with such misdirection along the Y direction (the nozzle array direction 254) is that it can be difficult to compensate for during printing. One option is to adjust the spacing of pairs of drop ejectors in the arrays of group 430 to compensate during the design of a printhead die 451 having a configuration such as that shown in FIG. 8.

Figure 9:
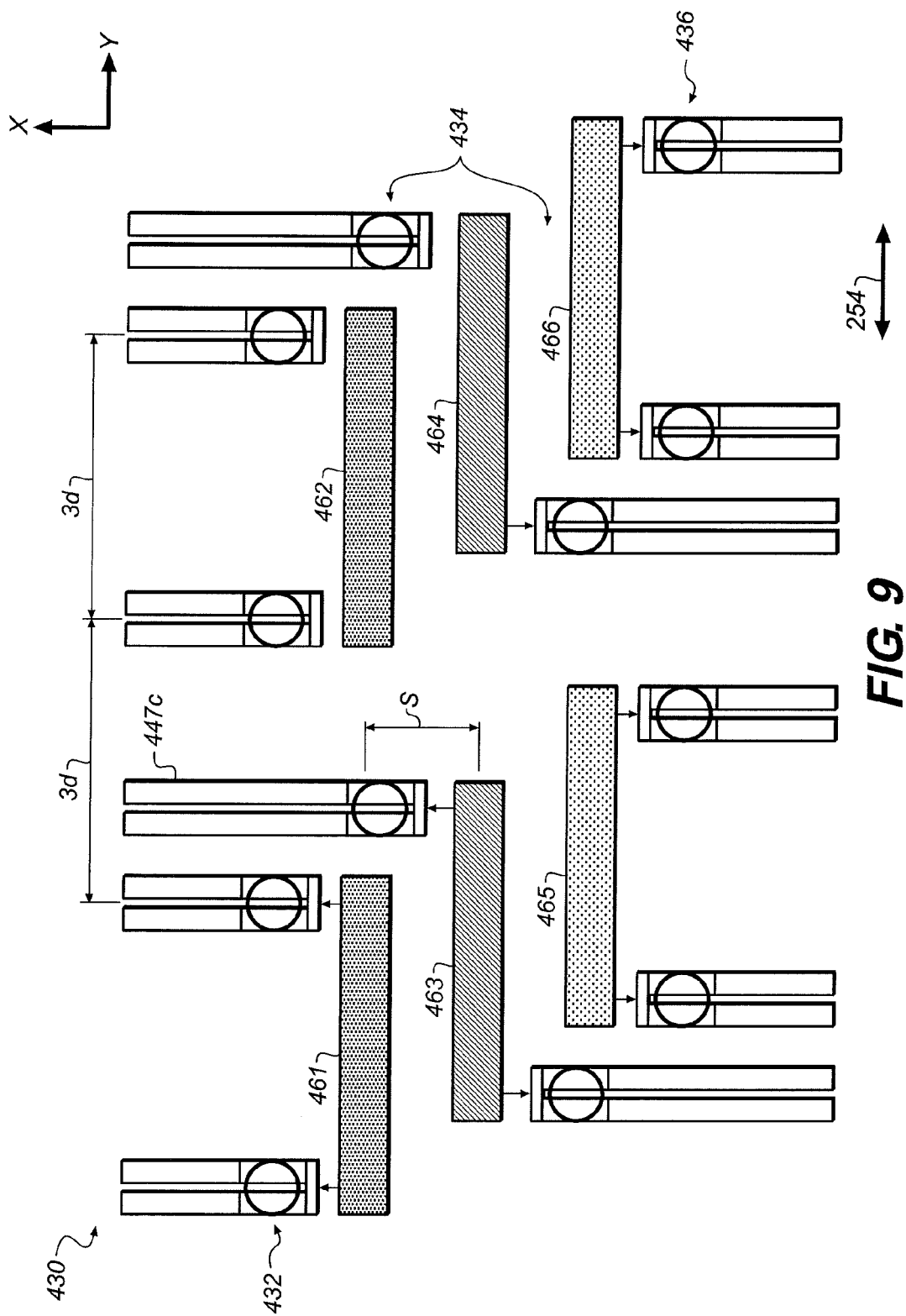
FIG. 9 is a close-up view of a portion of a group of arrays of nozzles and their respective ink feeds and electrical leads, according to an embodiment of the invention.

An embodiment having an alternative configuration of group 430 of arrays is shown in FIG. 9. In this embodiment, the ink feed holes 461 through 466 are lengthened along the array direction, so that they can supply ink by an ink flow along the X direction (the carriage scan direction) that is perpendicular to nozzle array direction 254. In this particular example, ink feed holes 461 and 462 supply ink to their respective drop ejectors of first outermost array 432 in a +X direction, while ink feed holes 465 and 466 supply ink to their respective drop ejectors of second outermost array 436 in a −X direction. The drop ejectors of inner array 434 are arranged in a staggered configuration rather than in a straight line, so that ink feed holes 463 and 464 supply one member of their pairs in a +X direction and the other member in a −X direction. Although there may be asymmetries in drop ejection due to the different ink flow directions (and there is also an offset of drop ejectors along the X direction in the staggered inner array 434), it is straightforward to correct the position of dots along the X direction (the carriage scan direction) by adjusting the timing of firing the drops as the carriage 200 moves the printhead back and forth across the recording medium during printing.

In the embodiments shown in FIGS. 8 and 9 there is a spacing S along the X direction between different arrays in the group 430 of arrays, where S in FIG. 9 is a little larger than the spacing S in FIG. 8. If these figures were approximately to scale and if the distance between drop ejectors in first outermost array 432 were $3d=63.5$ microns, then S would be about 25 to 30 microns. It is not necessary to pack the arrays 432, 434 and 436 this closely along the X direction. In fact it can be difficult to connect ink supplies at spacings this close on the opposite face of the printhead die where the ink enters. As a result, in some embodiments the distance S between arrays in group 430 is extended to facilitate ink connection. However, this can result in the printhead die 451 growing larger, so that there is less cost advantage relative to the cost of two printhead die 251 (with reference to FIG. 3).

Figure 10:
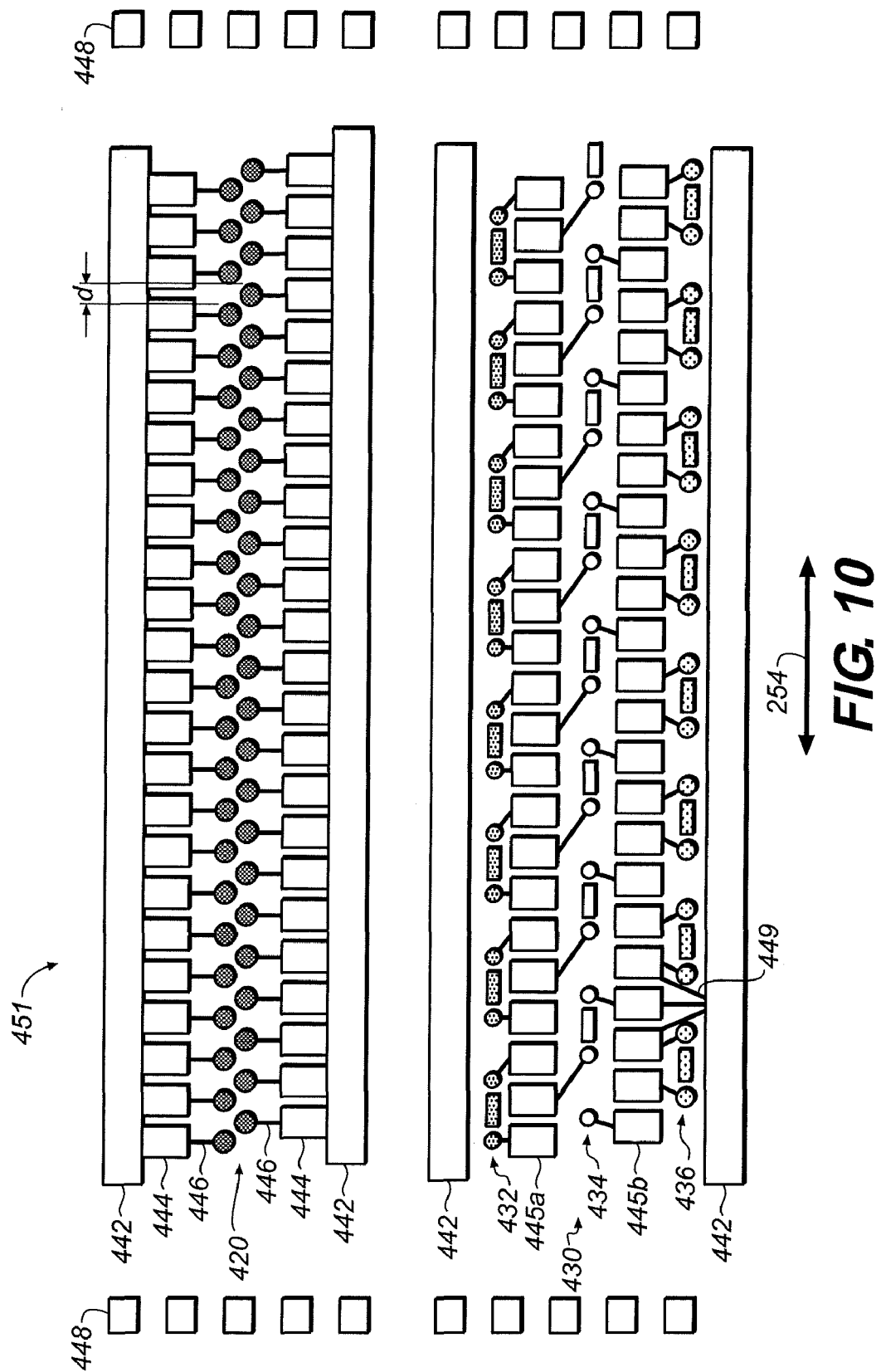
FIG. 10 is a schematic layout of a printhead die including a first array of nozzles and a group of three arrays of nozzles, according to an embodiment of the invention.

FIG. 10 shows an embodiment in which S is extended, but without wasting substantial area on the printhead die 451. Instead of positioning the driver transistors 445 outside the group 430 of arrays, in FIG. 10, the driver transistors 445 are positioned between adjacent arrays in the group 430. Driver transistors 445a are positioned between first outermost array 432 and inner array 434, while driver transistors 445b are positioned between inner array 434 and second outermost array 436. In each array of group 430, the nozzles are shown as circles and the ink feeds are shown as rectangles between adjacent pairs of nozzles. Electrical leads from driver transistors 445a and 445b to the respective nozzles are shown but not labeled for clarity. There must also be leads connecting the driver transistors with the logic electronics 442. A group of three electrical leads 449 are shown connecting logic electronics 442 and driver transistors 445b. Electrical leads 449 pass between adjacent ink feed holes in an outermost array 436.

In the exemplary embodiment shown in FIG. 10, all of the driver transistors 445a and 445b are located between the first outermost array 432 and the second outermost array 436. However, in other embodiments (not shown) driver transistors connected to inner array 434 are located between the two outermost arrays 432 and 436, but the driver transistors connected to the outermost arrays are located adjacent to the logic electronics 442. This can make electrical interconnection easier in some cases. In addition, because the packing density of the driver transistors for only the inner array can be disposed at a packing density of 400 per inch (one side of inner array 434) or 200 per inch both sides of inner array 434, they do not need to take up as much room along the Y direction. Similarly, the driver transistors outside the outermost arrays can also be packed at 400 per inch rather than at 600 per inch. It is found that for a particular example of a thermal inkjet printing device, the area of a driver transistor packed at 600 per inch is approximately 0.2 mm by 0.04 mm. However, for driver transistors packed at 200 per inch, the area of a driver transistor is about 0.07 mm by 1.2 mm. Thus, in the FIG. 10 example, the distance S between arrays needs to grow by about 0.2 mm in order to accommodate the driver transistors, but it would only need to grow by 0.07 mm if the driver transistors for the inner array 434 were packed at 200 per inch on either side of the inner array 434. In either case, additional room is provided between ink feeds for the different arrays in group 430, thus facilitating ink connection on the other side of printhead die 451, without requiring substantial additional wasted space on printhead die 451. Printhead die 451 can be on the order of 5% to 50% wider than corresponding printhead die 251, but only one printhead die 451 is required for CMYK printing rather than two printhead die 251, so there is still a substantial cost savings in the printhead.

If locating the driver transistors between outermost arrays 432 and 436 does not provide sufficient spacing between arrays to facilitate ink connection to the ink feed holes on the opposite side of the printhead die, in some embodiments the logic electronics 442 can also be located between outermost arrays 432 and 436, as described below with reference to FIG. 12.

Figure 11:
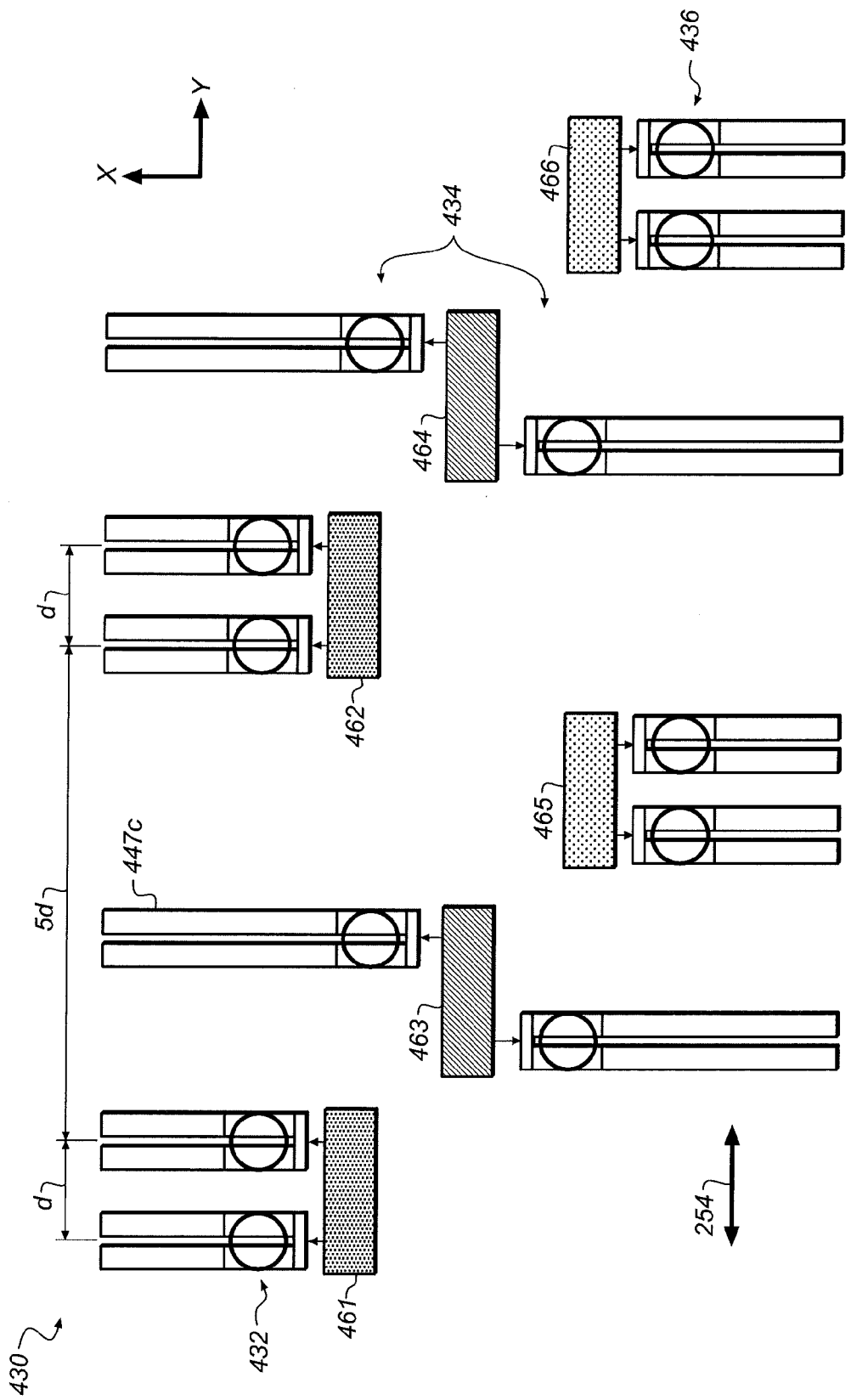
FIG. 11 is a close-up view of a portion of a group of arrays of nozzles and their respective ink feeds and electrical leads, according to an embodiment of the invention.

In the embodiments described above, the order of nozzles along the nozzle array direction 254 in group 430 of N=3 arrays has been a sequential alternating between first outermost array 432, inner array 434, and second outermost array 436, such that the spacing between two adjacent nozzles with any of the three arrays has been Nd=3d. In such a configuration, even on a microscopic scale, the dot forming resolution for arrays 432, 434 and 436 is $R_1/N=R_1/3$. FIG. 11 shows another embodiment that is similar to the embodiment shown in FIG. 9, except in the embodiment shown in FIG. 11, the alternating of nozzles along the nozzle array direction 254 is done in pairs of nozzles from first outermost array 432, pairs of nozzles from inner array 434, and pairs of nozzles from second outermost array 436. As a result, the spacing between adjacent pairs of nozzles in arrays 432, 434 and 436 alternates between d and 5d. The distance between next nearest neighbor nozzles within any one of the three arrays of group 430 is d+5d=6d, which is the same as the distance between next nearest neighbor nozzles in the embodiment shown in FIG. 9 (3d+3d). Thus the average (or effective) dot forming resolution of any of the three arrays in group 430 is still $R_1/3$.

Although the case of N=3 arrays in group 430 is interesting from the standpoint of providing arrays of dot forming elements for subtractive printing colors cyan, magenta and yellow, in other embodiments N is not equal to 3. For example, in order to extend the color gamut, in some embodiments N can equal 5, for example, where the arrays in group 430 are arranged as a first outermost array, a second outermost array and (N−2)=3 inner arrays that are located between the first outermost array and the second outermost array. The dot forming resolution (or average dot forming resolution) of each of the five arrays is $R_1/N=R_1/5$. The first array 420 in such embodiments could still be for printing black text at high speed. The five arrays in group 430 can be for cyan, magenta, yellow, light cyan, and light magenta. Alternatively, the five arrays in group 430 can be for cyan, magenta, yellow, orange and green, or other such colors to extend the color gamut of the printing device.

Figure 12:
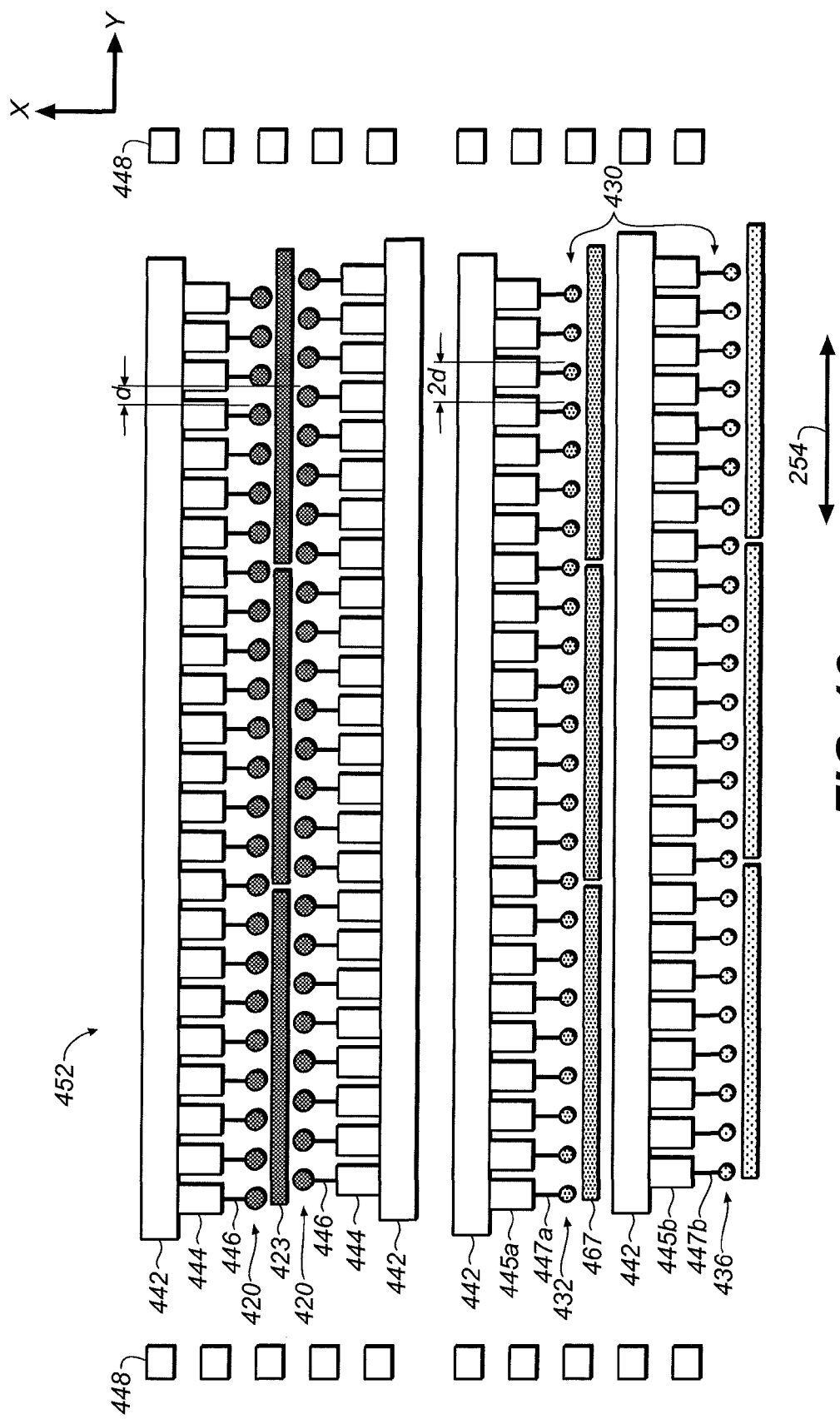
FIG. 12 is a schematic layout of a printhead die including a first array of nozzles and a group of two arrays of nozzles, according to an embodiment of the invention.

FIG. 12 shows an embodiment of a printhead die 452 where group 430 includes only N=2 arrays. For N=2, there is only a first outermost array 432 and a second outermost array 436. There are no innermost arrays (N−2=0). Because there are no inner arrays, routing of electrical leads 447a and 447b from the driver transistors 445a and 445b to arrays 432 and 436, as well as placement of the ink feeds 467 and 468 is for arrays 432 and 436 is less complex than for embodiments where N>2. Spacing between nozzles in arrays 432 and 436 is 2d to provide a dot forming resolution of $R_1/N=R_1/2$. In the example shown in FIG. 12, logic electronics 442 and driver transistors 445b corresponding to second outermost array 436 are located between first outermost array 432 and second outermost array 436, in order to provide additional space between ink feeds 467 and 468, without using additional space on printhead die 452.

For printhead die 452 shown in FIG. 12, if first array 420 is fed with black ink from ink feeds slots 423 to provide a dot forming resolution $R_1$ along nozzle array direction 254, then group 430 only has two additional ink types fed at ink feed holes 467 and 468 available for arrays 432 and 436, so that a full color printing device is not provided by the example shown in FIG. 12. However, this embodiment of a printhead die 452 can still be very useful. In some embodiments, multiple printhead die 452 of the type similar to that shown in FIG. 12 can be included in the same printhead. Consider a printhead embodiment that looks similar to FIG. 3, but instead of two printhead die 251 affixed to a common mounting support member 255 there are two printhead die 452 affixed to a common mounting support member 255. In such a case, (rather than having four nozzle arrays 253 at a nozzle spacing to provide a dot forming resolution $R_1$ for each nozzle array 253), with two printhead die 452 there would be a total of two first arrays 420 at a nozzle spacing to provide a dot forming resolution $R_1$, plus four nozzle arrays (two groups 430 of N=2) at a nozzle spacing to provide a dot forming resolution $R_1/2$. Inks for the two first arrays 420 could be black for text printing plus a colorless protective ink. Herein, we will consider black ink and colorless ink to be inks of different colors, even though, strictly speaking, colorless ink lacks a color. Inks for the four nozzle arrays in groups 430 could be cyan, magenta, yellow, and a black ink for photo printing. Such an embodiment could provide high quality full-color printing in four passes (two interlacing passes times two banding passes). More generally, the two printhead die do not need to be identical. For example, one first array 420 could provide a dot forming resolution $R_1$ and the other first array 420 could provide a dot forming resolution $R_2$. In addition, the two groups 430 do not need to have the same number N of arrays in the group, but one group could have $N_1$ arrays and the other group could have $N_2$ arrays.

Of course, it is not necessary to use two separate printhead die 452. In another embodiment, a single printhead die includes two first arrays 420 and two groups 430 of N=2 arrays all on the same substrate. While not explicitly shown in a figure, this could look like two copies of FIG. 12 that are displaced from one another along the Y direction. In some embodiments, one half of the die could be mirrored with respect to the other half, such that the first arrays 420 are toward the outside edges of the printhead die, and the groups 430 of arrays could be located in an inner region of the printhead die.

The invention has been described in detail with particular reference to certain preferred embodiments thereof, but it will be understood that variations and modifications can be effected within the spirit and scope of the invention.

Parts List

10 Inkjet printer system
12 Image data source
14 Controller
15 Image processing unit
16 Electrical pulse source
28 First fluid source
19 Second fluid source
20 Recording medium
100 Inkjet printhead
110 Inkjet printhead die
111 Substrate
120 First nozzle array
121 Nozzle(s)
122 Ink delivery pathway (for first nozzle array)
123 Ink feed slot(s)
130 Second nozzle array
131 Nozzle(s)
132 Ink delivery pathway (for second nozzle array)
133 Ink feed slot(s)
142 Logic electronics
144 Driver transistors
146 Electrical leads
148 Interconnection pads
181 Droplet(s) (ejected from first nozzle array)
182 Droplet(s) (ejected from second nozzle array)
200 Carriage
250 Printhead chassis
251 Printhead die
253 Nozzle array
254 Nozzle array direction
255 Mounting support member
256 Encapsulant
257 Flex circuit
258 Connector board
262 Multi-chamber ink supply
264 Single-chamber ink supply
300 Printer chassis
302 Paper load entry direction
303 Print region
304 Media advance direction
305 Carriage scan direction
306 Right side of printer chassis
307 Left side of printer chassis
308 Front of printer chassis
309 Rear of printer chassis
310 Hole (for paper advance motor drive gear)
311 Feed roller gear
312 Feed roller
313 Forward rotation direction (of feed roller)
320 Pick-up roller
322 Turn roller
323 Idler roller
324 Discharge roller
325 Star wheel(s)
330 Maintenance station
370 Stack of media
371 Top piece of medium
380 Carriage motor
382 Carriage guide rail
383 Encoder fence
384 Belt
390 Printer electronics board 392 Cable connectors
420 First array
423 Ink feed slot(s)
430 Group (of three arrays)
431 Nozzle
432 First outermost array
434 Inner array
436 Second outermost array
442 Logic electronics
444 Driver transistors
445 Driver transistors
445a Driver transistors
445b Driver transistors
446 Electrical leads
447 Electrical leads
447a Electrical leads
447b Electrical leads
447c Electrical leads
447d Electrical leads
449 Electrical leads
451 Printhead die
452 Printhead die
461-468 Ink feed holes
471a Heater leg(s)
471b Heater leg(s)
472 Shorting bar

The invention claimed is:

1. A printing device, comprising:
a first array of dot forming elements disposed on a substrate along an array direction at a first array-direction spacing to provide a first dot forming resolution $R_1$ for dots of a first color;
and a group of N arrays of dot forming elements, wherein:
the dot forming elements in each array of the group of N arrays are disposed on the substrate along the array direction at a second array-direction spacing to provide a dot forming resolution equal to $R_1/N$;
at least one of the N arrays of dot forming elements forms dots of a different color than at least one of the other arrays of the N arrays in the group; and
N is greater than 1.

2. The printing device of claim 1, wherein the first array forms black dots.

3. The printing device of claim 2, wherein N=3, and wherein the dots formed by the three arrays in the group are cyan dots, magenta dots, and yellow dots, respectively.

4. The printing device of claim 1, wherein the dot forming elements are inkjet drop ejectors.

5. The printing device of claim 1, wherein the dots provided by the first array of dot forming elements are a first size, and wherein the dots provided by an array in the group of N arrays are a second size not equal to the first size.

6. The printing device of claim 5, wherein the second size is less than the first size.

7. The printing device of claim 5, wherein the dots provided by all N arrays of the group of arrays are substantially equal to the second size.

8. The printing device of claim 1, wherein the N arrays in the group of dot forming elements are displaced from each other in a direction that is perpendicular to the array direction.

9. The printing device of claim 1, further comprising electrical leads for the dot forming elements, wherein:
the N arrays are disposed as a first outermost array of the group, a second outermost array of the group, and N−2 inner arrays;
the first outermost array includes a plurality of colorant supply holes to provide colorant to the dot forming elements of that array; and
an electrical lead for a dot forming element in an inner array passes between a first colorant supply hole and a second colorant supply hole adjacent to the first colorant supply hole of the first outermost array of the group.

10. The printing device of claim 9, wherein:
the second outermost array of the group includes a plurality of colorant supply holes to provide colorant to the dot forming elements of that array; and
an electrical lead for a dot forming element in the inner array passes between a first colorant supply hole and a second colorant supply hole adjacent to the first colorant supply hole of the second outermost array of the group.

11. The printing device of claim 10, wherein electrical leads for half of the dot forming elements in the inner array pass between colorant supply holes of the first outermost array of the group, and electrical leads for half of the dot forming elements in the inner array pass between colorant supply holes of the second outermost array of the group.

12. The printing device of claim 1, further comprising a plurality of driver transistors for the dot forming elements, wherein:
the N arrays are disposed as a first outermost array of the group, a second outermost array of the group, and N−2 inner arrays; and
at least one driver transistor is located between the first outermost array of the group and the second outermost array of the group.

13. The printing device of claim 12, wherein:
the first outermost array includes a plurality of colorant supply holes to provide colorant to the dot forming elements of that array; and
an electrical lead from the at least one driver transistor located between the first outermost array and the second outermost array passes between a first colorant supply hole and a second colorant supply hole adjacent to the first colorant supply hole of the first outermost array of the group.

14. A printing apparatus including a first printing device and a carriage for moving the first printing device during printing, the first printing device comprising:
a first array of dot forming elements disposed on a substrate along an array direction at a first array-direction spacing to provide a first dot forming resolution $R_1$ for dots of a first color;
and a group of $N_1$ arrays of dot forming elements, wherein:
the dot forming elements in each array of the group of $N_1$ arrays are disposed on the substrate along the array direction at a second array-direction spacing to provide a dot forming resolution equal to $R_1/N_1$;
at least one of the $N_1$ arrays of dot forming elements forms dots of a different color than at least one of the other arrays of the $N_1$ arrays in the group; and
$N_1$ is greater than 1.

15. The printing apparatus of claim 14 further including a second printing device that is moved by the carriage during printing, the second printing device comprising:
a first array of dot forming elements disposed along an array direction at a first array-direction spacing to provide a first dot forming resolution $R_2$ for dots of a first color;
and a group of $N_2$ arrays of dot forming elements, wherein:

the dot forming elements in each array of the group of $N_2$ arrays are disposed along the array direction at a second array-direction spacing to provide a dot forming resolution equal to $R_2/N_2$;

at least one of the $N_2$ arrays of dot forming elements forms dots of a different color than at least one of the other arrays of the $N_2$ arrays in the group; and $N_2$ is greater than 1.

16. The printing apparatus of claim 15, wherein $N_1 = N_2$ and $R_1 = R_2$.

17. The printing apparatus of claim 15, wherein the first printing device and the second printing device are affixed to a common mounting support member.

18. The printing device of claim 14, further comprising a second array of dot forming elements disposed on the substrate along an array direction at the first array-direction spacing to provide the first dot forming resolution $R_1$ for dots of a second color.

19. The printing device of claim 14, further comprising a second group of $N_2$ arrays of dot forming elements disposed on the substrate along the array direction at the first array-direction spacing to provide the second dot forming resolution $R_1/N_2$ for dots of a third color.

20. A printing device comprising:

a first array of dot forming elements disposed along an array direction at a first array-direction spacing to provide a first dot forming resolution $R_1$ for dots of a first color;

and a group of N arrays of dot forming elements, wherein:

the dot forming elements in each array of the group of N arrays are disposed on the substrate along the array direction at a second array-direction spacing to provide a dot forming resolution less than $R_1/2$;

at least one of the N arrays of dot forming elements forms dots of a different color than at least one of the other arrays of the N arrays in the group; and N is greater than 1.

\* \* \* \* \*